(12) United States Patent
Chun et al.

(10) Patent No.: US 8,432,819 B2
(45) Date of Patent: Apr. 30, 2013

(54) METHOD FOR TRANSMITTING FEEDBACK INFORMATION

(75) Inventors: Jin Young Chun, Anyang-si (KR); Bin Chul Ihm, Anyang-si (KR); Wook Bong Lee, Anyang-si (KR); Jae Won Chang, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 613 days.

(21) Appl. No.: 12/441,454

(22) PCT Filed: Oct. 31, 2007

(86) PCT No.: PCT/KR2007/005447
§ 371 (c)(1),
(2), (4) Date: Mar. 16, 2009

(87) PCT Pub. No.: WO2008/054142
PCT Pub. Date: May 8, 2008

(65) Prior Publication Data
US 2010/0085912 A1 Apr. 8, 2010

Related U.S. Application Data

(60) Provisional application No. 60/863,780, filed on Oct. 31, 2006.

(30) Foreign Application Priority Data

Jan. 24, 2007 (KR) .................. 10-2007-0007424

(51) Int. Cl.
*H04L 27/28* (2006.01)
(52) U.S. Cl.
USPC .......................................... 370/252; 370/241
(58) Field of Classification Search .................. None
See application file for complete search history.

(56) References Cited

U.S. PATENT DOCUMENTS

| | | | |
|---|---|---|---|
| 6,606,320 B1 | 8/2003 | Nomura et al. | |
| 7,729,442 B2* | 6/2010 | Kim et al. | 375/295 |
| 7,752,519 B2* | 7/2010 | Yeo et al. | 714/748 |
| 7,881,247 B2* | 2/2011 | Pan et al. | 370/319 |
| 8,077,654 B2* | 12/2011 | Sutivong et al. | 370/328 |
| 8,170,571 B2* | 5/2012 | Nishio | 455/450 |
| 2006/0209883 A1* | 9/2006 | Suzuki | 370/465 |
| 2007/0070928 A1* | 3/2007 | Sutivong et al. | 370/310 |
| 2007/0171864 A1* | 7/2007 | Zhang et al. | 370/329 |
| 2007/0173280 A1* | 7/2007 | Nakayauchi et al. | 455/522 |
| 2007/0195974 A1* | 8/2007 | Li et al. | 381/94.3 |
| 2007/0277074 A1* | 11/2007 | Yeo et al. | 714/749 |
| 2008/0013610 A1* | 1/2008 | Varadarajan et al. | 375/221 |
| 2008/0043867 A1* | 2/2008 | Blanz et al. | 375/260 |
| 2008/0049709 A1* | 2/2008 | Pan et al. | 370/344 |
| 2008/0095252 A1* | 4/2008 | Kim et al. | 375/260 |
| 2009/0067531 A1* | 3/2009 | Lee et al. | 375/267 |
| 2011/0122971 A1* | 5/2011 | Kim et al. | 375/316 |
| 2012/0117437 A1* | 5/2012 | Kim et al. | 714/748 |

FOREIGN PATENT DOCUMENTS

| | | |
|---|---|---|
| EP | 1 531 562 A2 | 5/2005 |
| KR | 2003-0095634 A | 12/2003 |

\* cited by examiner

*Primary Examiner* — Jay P Patel
(74) *Attorney, Agent, or Firm* — Birch, Stewart, Kolasch & Birch, LLP

(57) ABSTRACT

There is provided a method for enabling a user equipment to transmit feedback information. The method includes generating feedback data representing the feedback information, the feedback data expressed by a binary number having N bits, where N is an integer, the N bits comprising 2 levels, the feedback information represented by one of the 2 levels, wherein different types of the feedback information are assigned to different levels and transmitting the feedback data. Overheads incurred by transmission of feedback information can be reduced.

14 Claims, 3 Drawing Sheets

[Fig. 1]
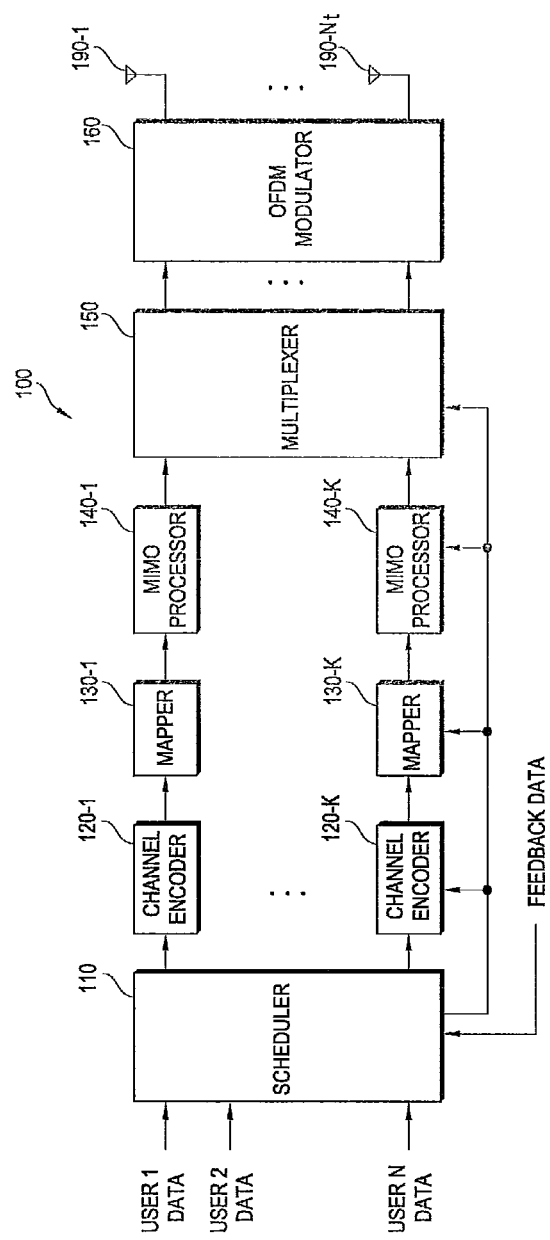

[Fig. 2]
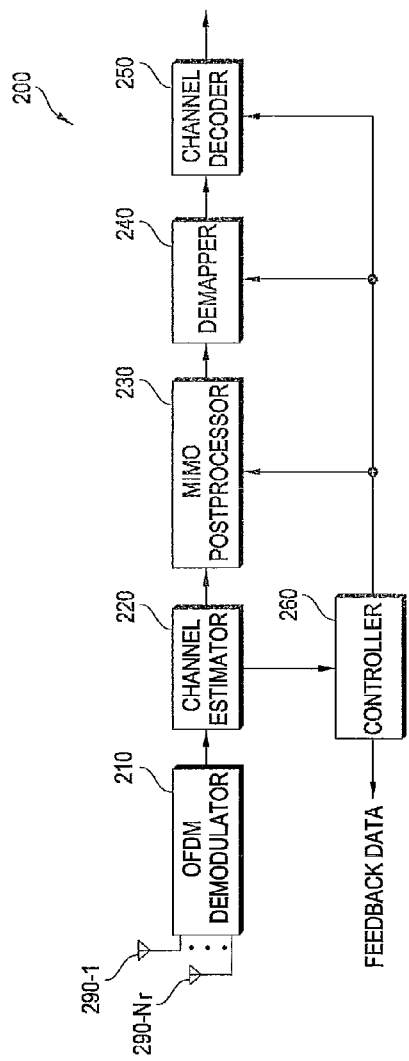
[Fig. 3]
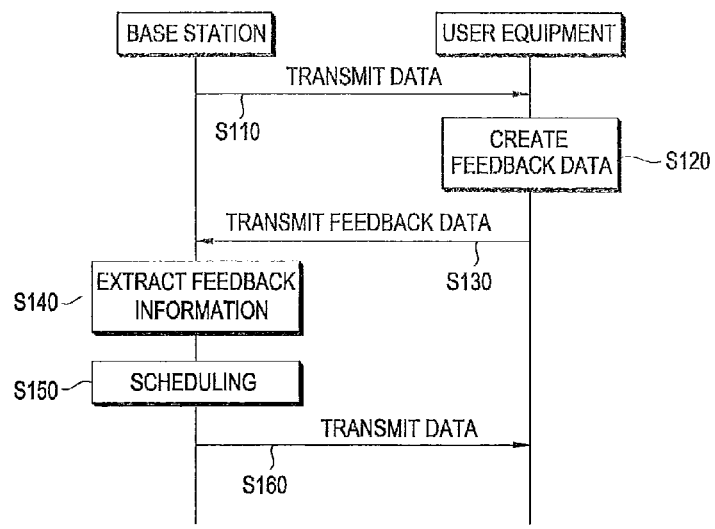

[Fig. 4]
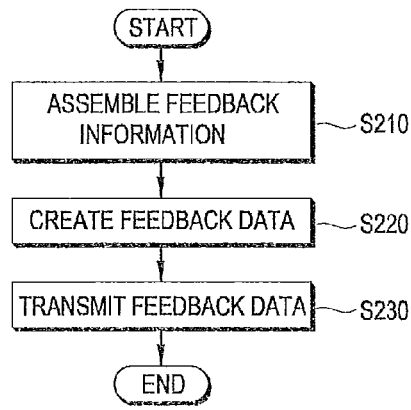
[Fig. 5]
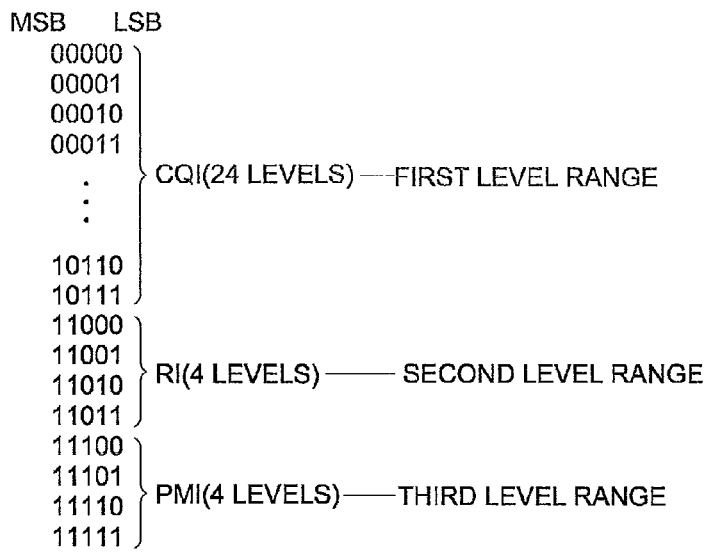
[Fig. 6]
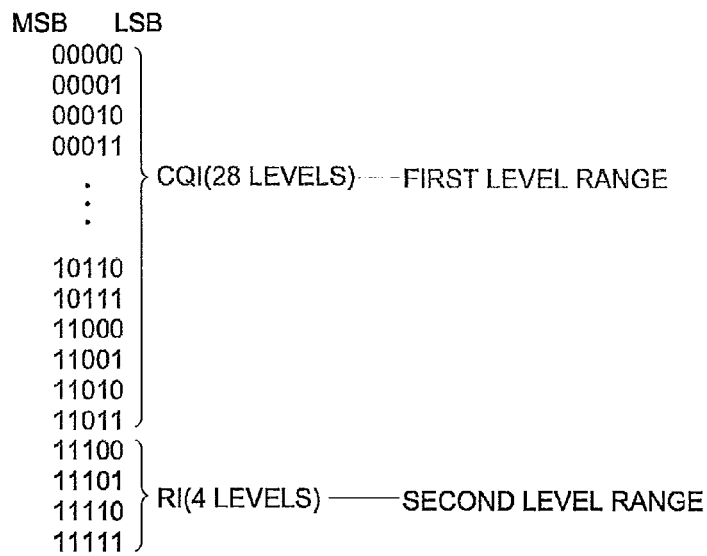

METHOD FOR TRANSMITTING FEEDBACK INFORMATION

This application is the National Phase of PCT/KR2007/005447 filed on Oct. 31, 2007, which claims priority under 35 U.S.C. 119(e) to U.S. Provisional Application No. 60/863,780 filed on Oct. 31, 2006, and under 35 U.S.C. 119(a) to Patent Application No. 10-2007-0007424 filed in the Republic of Korea on Jan. 24, 2007, respectively, all of which are hereby expressly incorporated by reference into the present application.

TECHNICAL FIELD

The present invention relates to wireless communication and more specifically, to a method for reducing overheads incurred by various types of feedback information.

BACKGROUND ART

Various methods for transmitting high-quality and high-volume data under limited radio resources has been developed in wireless communication systems. A closed-loop system for providing a feedback channel from a user equipment to a base station is one of the methods.

In the closed-loop system, the user equipment provides various types of information to the base station and the base station adjusts a variety of system parameters, such as a power level, transmission format, and the like, using the provided information to improve system performance. For example, an adaptive modulation and coding (AMC) is a technique in which the base station adjusts a modulation and coding scheme (MCS) using feedback channel information to enhance link performance. If channel status is good, a data transmission rate is increased, whereas if the channel status is degraded, the data transmission rate is decreased, thereby supporting efficient transmission and increasing an average transmission rate as a result.

Channel quality information (CQI) is an example of the feedback information. Generally, CQI is measured at the user equipment and transmitted to the base station through an uplink channel. The base station can allocate best resources to each of the user equipment through the CQI.

In addition, various types of information, such as band selection information, acknowledgement/not-acknowledgement (ACK/NACK) signals, rank indicator (RI), precoding matrix indicator (PMI), and the like, as well as the CQI, are included in the feedback information transmitted from the user equipment to the base station. As various types of feedback information are required, overheads can be incurred in the uplink.

If five bits ($2^5$=32 levels) are used to transmit CQI, the CQI can be expressed in a quantum of between −10 dB and −22 dB quantized at intervals of 1 dB. Alternatively, there are 32 types of MCS levels, and one of the MCS levels appropriate to the CQI can be expressed with five bits. The five bits are transmitted after being channel coded, and since the feedback information should be further reliably coded than general uplink data, a high code rate is used. Therefore, a wide uplink bandwidth is used to transmit the feedback information. In this case, the bandwidth to be used for transmitting general uplink data will be decreased.

The entire frequency bandwidth is divided into 25 resource blocks (RBs), and one CQI can be transmitted through each of the resource blocks. In this case, as many as '25×5×code rate' bits are required for each user equipment to feedback CQI of five bits. Alternatively, the CQI can be transmitted through some of the resource blocks showing excellent CQI in the feedback information. Even in this case, band selection information for indicating in which resource block the CQI belongs to is separately needed.

In addition, a system using multiple antennas needs an RI. If a precoding method is used, a PMI is needed to indicate which precoding matrix is used.

As described above, the number of bits to be transmitted varies depending on the type of feedback information, and a different channel coding scheme is needed for feedback information of a different length, and thus the system can be complicated. Furthermore, an identifier for distinguishing a type of feedback information from various types of feedback information should be separately transmitted.

Accordingly, there is a need for a method for reducing overheads incurred by transmission of various types of feedback information and transmitting reliable feedback information through a narrow uplink bandwidth.

DISCLOSURE OF INVENTION

Technical Problem

It is an object of the invention to provide a method for transmitting feedback data which includes various types of feedback information.

It is another object of the invention to provide a method for reducing overheads incurred by transmission of the feedback information.

Technical Solution

In an aspect, there is provided a method for enabling a user equipment to transmit feedback information. The method includes generating feedback data representing the feedback information, the feedback data expressed by a binary number having N bits, where N is an integer, the N bits comprising $2^N$ levels, the feedback information represented by one of the $2^N$ levels, wherein different types of the feedback information are assigned to different levels and transmitting the feedback data.

In another aspect, there is provided a method for transmitting feedback information. The method includes preparing a first feedback information, preparing a second feedback information, generating a first feedback data and a second feedback information, feedback data represented by one of a plurality of levels, the plurality of levels classified into a plurality of level ranges, a level range comprising at least one level, wherein the first feedback information is assigned to the first level range of the first feedback data and the second feedback information is assigned to the second level range of the second feedback data, transmitting the first feedback data and transmitting the second feedback data.

In still another aspect, there is provided a method for processing feedback information transmitted from a user equipment. The method includes receiving the feedback data and extracting at least one type of feedback information from the feedback data, wherein the feedback data represented by one of a plurality of levels based on a predetermined number of bits and the type of the feedback information is identified by using the plurality of levels.

Advantageous Effects

Various types of feedback information can be identified without separate identifier, and thus radio resources for the identifier are unnecessary. Overheads incurred by transmission of feedback information can be reduced.

BRIEF DESCRIPTION OF THE DRAWINGS

FIG. 1 is a block diagram showing a transmitter having multiple antennas.

FIG. 2 is a block diagram showing a receiver having multiple antennas.

FIG. 3 is a flowchart illustrating a method of scheduling data according to an embodiment of the present invention.

FIG. 4 is a flowchart illustrating a method of transmitting feedback data according to an embodiment of the present invention.

FIG. 5 is a view showing an example of feedback data.

FIG. 6 is a view showing another example of feedback data.

MODE FOR THE INVENTION

FIG. 1 is a block diagram showing a transmitter having multiple antennas.

Referring to FIG. 1, a transmitter 100 includes a scheduler 110, channel encoders 120-1 to 120-K, mappers 130-1 to 130-K, multiple input multiple output (MIMO) processors 140-1 to 140-K, and a multiplexer 150. The transmitter 100 also includes Nt (Nt>1) transmission antennas 190-1 to 190-Nt. The transmitter 100 can be a part of a base station (BS). Generally, the base station is a fixed station communicating with a user equipment, which can be referred to as another terminology, such as a node-B, base transceiver system (BTS), access point, or the like.

The scheduler 110 receives data for N users and outputs K streams to be transmitted at a time. The scheduler 110 extracts feedback information from feedback data. The scheduler 110 selects a code rate, a modulation and coding scheme (MCS) such as a modulation scheme and a MIMO sheme and outputs them to the channel encoders 120-1 to 120-K, the mappers 130-1 to 130-K, and the MIMO processors 140-1 to 140-K.

Each of the channel encoders 120-1 to 120-K encodes an input stream in a predetermined coding scheme and forms coded data. Each of the mappers 130-1 to 130-K maps the coded data to a symbol representing a location on a signal constellation. Any kind of modulation scheme can be used, including m-Phase Shift Keying (m-PSK) and m-Quadrature Amplitude Modulation (m-QAM). For example, the m-PSK can be binary-PSK (BPSK), quadrature-PSK (QPSK), or 8-PSK, and the m-QAM can be 16-QAM, 64-QAM, or 256-QAM.

Each of the MIMO processors 140-1 to 140-K processes the input symbol in the MIMO method in accordance with the multiple transmission antennas 190-1 to 190-Nt. For example, the MIMO processors 140-1 to 140-K can use codebook-based precoding, i.e., receive a codebook index or a precoding matrix from the scheduler 110 and perform precoding.

The multiplexer 150 assigns the input symbol to an appropriate sub-carrier and multiplexes input symbols for each user. An orthogonal frequency division multiplexing (OFDM) modulator 160 performs OFDM modulation on the input symbols and outputs OFDM symbols. The OFDM modulator 160 can perform inverse fast Fourier transform (IFFT) on the input symbols and additionally insert a cyclic prefix (CP) after performing the IFFT. The OFDM symbols are transmitted through respective transmission antennas 190-1 to 190-Nt.

The transmitter 100 can operate in two modes. The one is a single codeword mode, and the other is a multiple codeword mode. In the single codeword mode, transmission signals transmitted through MIMO channels have the same data rate. In the multiple codeword mode, data transmitted through the MIMO channels are independently encoded, so that a transmission signal may have a data rate that is different from those of other transmission signals. The single codeword mode operates in all ranks, whereas the multiple codeword mode operates when the RI is one or more.

FIG. 2 is a block diagram showing a receiver having multiple antennas.

Referring to FIG. 2, a receiver 200 comprises an OFDM demodulator 210, a demapper 240, a channel decoder 250, and a controller 260. Although one receiver 200 is shown in the figure, a plurality of receivers 200 can be installed in a system. The receiver 200 may be a part of a user equipment (UE). The user equipment can be fixed or mobile and referred to as another terminology, such as a mobile station (MS), a user terminal (UT), a subscriber station (SS), a wireless device, or the like. A downlink means communication from the base station to the user equipment, and an uplink means communication from the user equipment to the base station.

The OFDM demodulator 210 performs fast Fourier transform (FFT) on signals received from receiving antennas 290-1 to 290-Nr. A channel estimator 220 estimates a channel, and a MIMO post-processor 230 performs a post-process corresponding to the MIMO processors 140-1 to 140-K. The demapper 240 demaps input symbols into coded data, and the channel decoder 250 decodes the coded data and restores original data.

The controller 260 prepares appropriate feedback information through the estimated channel or the like, creates feedback data from the feedback information, and feeds back the created feedback data to the transmitter 100.

The feedback information is extracted from the feedback data transmitted from the user equipment, which can be various types of information such as CQI, band selection information, ACK/NACK signal, RI, PMI, and the like. CQI is information on downlink channel status provided by the user equipment to the base station in order to allocate downlink resources, which can be a variety of types such as a signal-to-interference plus noise ratio (SINR), modulation and coding scheme (MCS) level, data rate indicator, received signal strength indicator, and the like. The feedback information is converted into feedback data. The feedback data has a predetermined number of bits regardless of the type of the feedback information. The type of the feedback information can be classified based on the level of the feedback data.

FIG. 3 is a flowchart illustrating a method of scheduling data according to an embodiment of the present invention.

Referring to FIG. 3, a base station transmits data to a user equipment S110. The data may include a preamble, a pilot signal, and the like.

The user equipment creates feedback data after determining feedback information from the received preamble, pilot signal, and the like S120. Various types of feedback information can be included in the feedback data. Feedback data having the same number of bits as that of the feedback information is created from the various types of feedback information. The user equipment transmits the created feedback data to the base station S130.

The base station extracts feedback information from the received feedback data S140. The base station selects a code rate, a modulation and coding scheme such as a modulation scheme, and a MIMO method through the extracted feedback information and schedules data to transmit to the downlink S150. The base station transmits the scheduled data to the user equipment S160.

FIG. 4 is a flowchart illustrating a method of transmitting feedback data according to an embodiment of the present invention.

Referring to FIG. 4, a user equipment receives the preamble, pilot signal, and the like transmitted from a base station through a certain channel and assembles feedback information to feedback to the base station S210. There may be various types of feedback information, such as CQI, band selection information, ACK/NACK signal, RI, PMI, and the like.

The user equipment creates feedback data from the feedback information 5220. The feedback data has a predetermined number of bits regardless of the type of the feedback information. The feedback data has a predetermined number of levels based on the number of bits, and a plurality type of feedback information is expressed based on the levels.

The number of levels is the number of entire levels that the feedback data may have. That is, if the number of bits of the feedback data is m, the feedback data has $2^m$ levels, and the number of levels of the feedback data becomes $2^m$.

The feedback data may have a plurality of level ranges. The level range is a part of the entire levels that the feedback data has. That is, the entire levels of the feedback data can be divided into k level ranges. The number of levels belonging to each of the level ranges can be arbitrarily determined. If the number of levels belonging to a level range is assumed as S, S is less than $2^m$, i.e., $S<2^m$. Various types of feedback information can be assigned to each of the level ranges.

If the number of bits of the feedback data is five, the feedback data has 32 levels. If the number of level ranges k is three, the feedback data has three level ranges by dividing the 32 levels into three parts. It is assumed that if the three level ranges are a first level range, a second level range, and a third level range, the first level range has 24 levels, the second level range has 5 levels, and the third level range has 4 levels. At this point, the first level range may include level 1 to level 24 of the entire levels, the second level range may include level 25 to level 28 of the entire levels, and the third level range may include level 29 to level 32 of the entire levels.

The number of bits m of the feedback data can be transmitted from the base station to the downlink or can be a previously promised number of bits. The number of levels of the feedback data can be transmitted from the base station to the user equipment or can be a previously known to both the base station and the user equipment. In addition, the number of level ranges k can be transmitted from the base station to the downlink or can be previously determined for each system. In addition, the number of levels that each of the level ranges has and/or the types of feedback information assigned to each of the level ranges can be transmitted from the base station to the downlink or can be previously determined. The number of bits m and the number of level ranges k of the feedback data are not limited and can be differently determined depending on channel environments of the system, configuration of the system, and the like.

The user equipment transmits the created feedback data to the base station S230.

FIG. 5 is a view showing an example of feedback data according to an embodiment of the present invention.

Referring to FIG. 5, the number of bits m of the feedback data is five, and the number of level ranges k of the feedback data is three. If the feedback data is configured with five bits, the feedback data has $2^5$ (=32) levels. The levels of the feedback data are divided into three level ranges. The three level ranges become a first level range, a second level range, and a third level range.

The first level range can be level 1 '00000' to level 24 '10111' the second level range can be level 25 '11000' to level 28 '11011', and the third level range can be level 29 '11100' to level 32 '11111'. Various types of feedback information can be assigned to each of the level ranges. For example, CQI can be assigned to the first level range, RI to the second level range, and PMI to the third level range. At this point, the CQI has 24 levels, the RI has 4 levels, and the PMI has 4 levels.

Each of levels 1 to 24 of the first level range representing the CQI corresponds to a value of CQI. That is, level 1 corresponds to the highest CQI value, and sequentially, level 24 can correspond to the lowest CQI value. Then, levels 25 to 28 of the second level range representing RI can correspond to RIs of 1, 2, 3, and 4, and levels 29 to 32 of the third level range representing PMI can correspond to PMIs of 1, 2, 3, and 4.

The base station can identify the type and value of the feedback information by confirming the value of the feedback data. For example, if the value of 5-bit feedback data is '00010', the base station determines that the feedback information is CQI corresponding to the first level range. Then, the base station can confirm that the value of the CQI is the third highest CQI value. If the value of the feedback data is '11010', the base station determines that the feedback information is RI corresponding to the second level range. Then, the base station can confirm that the value of the RI is three. Accordingly, the base station can identify various types of feedback information expressed by the feedback data without a separate identifier by confirming the value of the feedback data.

In this manner, since various types of feedback information can be expressed without a separate identifier using feedback data of a predetermined size, overheads incurred by the uplink of the feedback data can be reduced.

It is assumed that 5-bit band selection information, 5-bit CQI, 2-bit RI, and 2-bit PMI are fed back as feedback information. When each of the feedback information itself is fed back, at least an identifier of two bits should be added to each of the feedback information in order to classify the four types of feedback information. Accordingly, total number of bits needed to feedback the four types of feedback information becomes (5+2)+(5+2)+(2+2)+(2+2)=22 bits. If a code rate of ten for the uplink is applied to the feedback data, the number of bits becomes 220 bits. If feedback data is used, since the separate identifiers are not needed, total number of bits of the entire feedback data becomes 5+5+5+5=20 bits. At this point, the number of levels of the feedback information can be reduced compared with a case of feeding back the feedback information itself. If a code rate of ten for the uplink is applied to the feedback data, the number of bits becomes 200 bits.

Accordingly, if a method for expressing various types of feedback information based on a level using feedback data of a predetermined size is used, overheads incurred by the uplink can be reduced. As the number of types of the feedback information is increased, the effect of reducing the overhead of the uplink will be further enhanced.

FIG. 6 is a view showing another example of feedback data according to an embodiment of the present invention.

Referring to FIG. 6, the number of bits m of the feedback data is five, and the number of level ranges k of the feedback data is two. If the feedback data is configured with five bits, the feedback data has 32 levels, and the levels of the feedback data are divided into two level ranges.

The first level range can be level 1 '00000' to level 28 '11011', and the second level range can be level 29 '11100' to level 32 '11111'. CQI can be assigned to the first level range, and RI can be assigned to the second level range. The CQI has 28 levels, and the RI has 4 levels. Each of levels 1 to 28 of the first level range representing the CQI corresponds to a value of CQI, and levels 29 to 32 of the second level range representing RI can correspond to RIs of 1, 2, 3, and 4.

The base station can identify the type and value of the feedback information by confirming the value of the feedback data. For example, if the value of the feedback data is '00000', the base station determines that the feedback information is CQI corresponding to the first level range, and the value of the CQI is the highest CQI value. If the value of the feedback data is '11111', the base station determines that the feedback information is RI corresponding to the second level range, and the value of the RI is four.

Table 1 shows a result of a simulation of system performance using five-bit feedback data to express CQI having 32 levels and CQI having 28 levels.

TABLE 1

|  | Sector throughput | Packet error rate |
| --- | --- | --- |
| CQI of 32 levels | $1.03e^4$ | $1.77e^{-2}$ |
| CQI of 28 levels | $1.03e^4$ | $1.67e^{-2}$ |

In the cases of expressing CQI of 32 levels and CQI of 28 levels, it is understood that sector throughputs and packet error rates (PER) of the system are almost the same. Therefore, it is understood that although four levels among 32 levels of the five-bit feedback data are used to express other feedback information, the performance of the system is almost unaffected.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method for transmitting feedback information by a device, the method comprising:
    generating, by the device, feedback data having a specific type of feedback information among a plurality of feedback information types,
    wherein the feedback data is generated with a fixed bit size irrespective of a corresponding feedback information type; and
    transmitting, by the device, the feedback data separately from other feedback data having another feedback information type through a common feedback channel used for both the feedback data and the other feedback data,
    wherein the fixed bit size is composed of N bits, where N is a predefined and fixed natural number,
    wherein possible values of the N bits are classified into a plurality of ranges, where a number of the plurality of ranges is equal to a number of the plurality of feedback information types such that the plurality of ranges corresponds one-to-one with the plurality of feedback information types, and
    wherein the specific type of feedback information of the feedback data is identified by a range including an actual value of the feedback data.

2. The method of claim 1, wherein the specific type of feedback information is one of channel quality information (CQI), a rank indicator (RI) and a precoding matrix indicator (PMI).

3. The method of claim 1:
    wherein the generating comprises:
        generating a first feedback data having a first type of feedback information; and
        generating a second feedback data having a second type of feedback information,
    wherein the transmitting comprises:
        transmitting the first feedback data at a first transmission time through the common feedback channel; and
        transmitting the second feedback data at a second transmission time through the common feedback channel,
    wherein a value of the first feedback data is included in a first range of the plurality of ranges, and a value of the second feedback data is included in a second range of the plurality of ranges, and
    wherein the first type of feedback information is identified by the first range and the second type of feedback information is identified by the second range.

4. The method of claim 3, wherein the first type of feedback information is different from the second type of feedback information.

5. The method of claim 3, wherein the first transmission time is different from the second transmission time.

6. The method of claim 3, wherein the first type of feedback information is CQI and the second type of feedback information is RI.

7. The method of claim 6, wherein the first range is larger than the second range.

8. A device configured to transmit feedback information, comprising:
    a processor configured to
        generate feedback data having a specific type of feedback information among a plurality of feedback information types
        wherein the feedback data is generated with a fixed bit size irrespective of a corresponding feedback information type, and
        transmit the feedback data separately from other feedback data having another feedback information type through a common feedback channel used for both the feedback data and the other feedback data,
    wherein the fixed bit size is composed of N bits, where N is a predefined and fixed natural number,
    wherein possible values of the N bits are classified into a plurality of ranges, where a number of the plurality of ranges is equal to a number of the plurality of feedback information types such that the plurality of ranges corresponds one-to-one with the plurality of feedback information types, and
    wherein the specific type of feedback information of the feedback data is identified by a range including an actual value of the feedback data.

9. The device of claim 8, wherein the specific type of feedback information is one of channel quality information (CQI), a rank indicator (RI) and a precoding matrix indicator (PMI).

10. The device of claim 8,
wherein the processor is configured to generate the feedback data by
generating a first feedback data having a first type of feedback information, and
generating a second feedback data having a second type of feedback information,
wherein the processor is configured to transmit the feedback data by
transmitting the first feedback data at a first transmission time through the common feedback channel, and
transmitting the second feedback data at a second transmission time through the common feedback channel,
wherein a value of the first feedback data is included in a first range of the plurality of ranges, and a value of the second feedback data is included in a second range of the plurality of ranges, and
wherein the first type of feedback information is identified by the first range and the second type of feedback information is identified by the second range.

11. The device of claim 10, wherein the first type of feedback information is different from the second type of feedback information.

12. The device of claim 10, wherein the first transmission time is different from the second transmission time.

13. The device of claim 10, wherein the first type of feedback information is CQI and the second type of feedback information is RI.

14. The device of claim 13, wherein the first range is larger than the second range.

* * * * *